United States Patent

Ogasawara et al.

[11] Patent Number: 6,151,306
[45] Date of Patent: Nov. 21, 2000

[54] VEHICLE MULTIPLEX COMMUNICATION SYSTEM

[75] Inventors: Kazuyoshi Ogasawara; Makoto Uda, both of Shizuoka, Japan

[73] Assignee: Yazaki Corporation, Tokyo, Japan

[21] Appl. No.: 09/041,004

[22] Filed: Mar. 12, 1998

[30] Foreign Application Priority Data

Mar. 12, 1997 [JP] Japan .................................. 9-057923

[51] Int. Cl.[7] .............................. B60L 1/10; H02G 3/00; H04L 12/43
[52] U.S. Cl. ....................... 370/242; 370/458; 307/10.1; 340/825.16
[58] Field of Search .............................. 307/10.1, 38, 39; 340/825.5, 825.51, 825.06, 825.16; 370/357, 360, 242, 244, 245, 458

[56] References Cited

U.S. PATENT DOCUMENTS

| 5,402,420 | 3/1995 | Kobayashi | 340/825.5 |
| 5,798,575 | 8/1998 | O'Farrell et al. | 307/10.1 |
| 5,948,025 | 9/1999 | Sonoda | 340/825.06 |
| 5,959,367 | 3/1995 | OFarrell et al. | 307/10.1 |
| 6,009,105 | 12/1999 | Hosokawa et al. | 370/458 |

FOREIGN PATENT DOCUMENTS 62-51331  3/1987  Japan .

*Primary Examiner*—Alpus H. Hsu
*Assistant Examiner*—Afsar M. Qureshi
*Attorney, Agent, or Firm*—Oblon, Spivak, McClelland, Maier & Neustadt, P.C.

[57] ABSTRACT

A vehicle communication multiplex system comprises: a bus; and a plurality of nodes connected to the bus, wherein transmission right circulates to the nodes in a predetermined order and send a predetermined number of data to the bus from the node which gets the transmission right. Each of the nodes includes, a block division section for dividing the data into blocks to prepare data blocks, a change-block-determination section for determining whether or not each of the data blocks prepared by the block division section changes as an event occurs, and a data transmission section, if the change-block-determination section determines that a data block changes, for extracting the data block from the block division section and sending the extracted data block to the bus.

10 Claims, 12 Drawing Sheets

FIG. 2

VEHICLE MULTIPLEX COMMUNICATION SYSTEM

BACKGROUND OF INVENTION

This invention relates to a vehicle multiplex communication system comprising a plurality of nodes on board of a vehicle connected to a bus and circulating the transmission right to the nodes in a predetermined order for the node getting the transmission right to send a predetermined number of data pieces to the bus.

In a vehicle such as an automobile, a plurality of electronic control nodes (electronic control units) are connected to a common bus and data is transferred between the nodes. In this case, token passing for circulating the transmission right to the nodes in a predetermined order for the node getting the transmission right to send a predetermined number of data pieces to the bus is known.

An art of an on-board electronic control system adopting this type of token passing is described, for example, in Unexamined Japanese Patent Application Publication No. Sho 62-51331, wherein a plurality of electronic control units are connected to one signal line and send a predetermined number of data pieces to the signal line in a predetermined order. Each electronic control unit is configured as shown in FIG. 12.

As shown in FIG. 13, after a lapse of predetermined data transfer stop time T0, an electronic control unit 110 shown in FIG. 13 outputs a predetermined number of data pieces (0–3) via a transistor 133 from an output terminal T to a signal line 120. Upon completion of the transfer of the data pieces as many as the predetermined number, likewise another electronic control unit 111 transfers a predetermined number of data pieces (0–4) to the signal line 120.

Further, as shown in FIG. 13, an electronic control unit 112 transfers a predetermined number of data pieces (0–2) to the signal line 120, then an electronic control unit 113 transfers a predetermined number of data pieces (0–5) to the signal line 120. If any of the electronic control units requires the data pieces as many as the predetermined number on the signal line 120, it receives the data.

However, each electronic control unit in the conventional on-board electronic control system transmits a predetermined number of data pieces, thus data also containing unchanged data in the data pieces as many as the predetermined number is transmitted repeatedly. Resultantly, the unchanged data occupies the bus unnecessarily, the time efficiency of the data transmission worsens, and the data transmission delay cannot be shortened.

SUMMARY OF INVENTION

It is an object of the invention to provide a vehicle multiplex communication system that can shorten the bus occupation time, improve time efficiency of data, and shorten a transmission delay of data.

According to the first aspect of the present invention, there is provided a vehicle communication multiplex system comprising a bus and a plurality of nodes connected to the bus, wherein transmission right circulates to the nodes in a predetermined order and send a predetermined number of data to the bus from the node which gets the transmission right, each of the nodes including, a block division section for dividing the data into blocks to prepare data blocks, a change block determination section for determining whether or not each of the data blocks prepared by the block division section changes as an event occurs, and a data transmission section, if the change block determination section determines that a data block changes, for extracting the data block from the block division section and sending the extracted data block to the bus.

According to the system of the present invention, data is divided into blocks and whether or not each data block changes as an event occurs is determined. If it is determined that a data block changes, the data block is extracted and sent to the bus. Thus, unchanged data blocks are not transferred, so that the bus occupation time can be shortened, the time efficiency of data can be improved, and the transmission delay of data can be shortened.

According to the second aspect of the invention, there is provided a vehicle communication multiplex system comprising a bus and a plurality of nodes connected to the bus, wherein transmission right circulates to the nodes in a predetermined order and send a predetermined number of data to the bus from the node which gets the transmission right, each of the nodes including, a change data determination section for determining whether or not the data changes as an event occurs, and a data transmission section, if the change data determination section determines that the data changes, for transferring all the data to the bus.

According to the invention, whether or not data changes as an event occurs is determined. If it is determined that the data changes, all the data is transferred to the bus. Thus, unchanged data is not transferred, so that the bus occupation time can be shortened, the time efficiency of data can be improved, and the transmission delay of data can be shortened.

In addition, each of the nodes further includes a flag setting section for setting a flag indicating reception error occurrence if a reception error occurs in the home node, and the data transmission section in the node where the reception error occurs adds flag information set by the flag setting section to the changed data block and sends the data frame to the bus, whereby resend control at the reception error occurrence time can be executed easily.

Futheremore, when transmitting the next data block to the changed data block already transmitted, the node receiving the changed data block to which the flag information is added on the bus sends all the data block to the bus, whereby the node in which a reception error occurs can receive the data that cannot be received due to the error.

Still futher, each of the nodes further includes a count section for counting stipulated time, and if the data block is not sent to the bus within the stipulated time, the data transmission section sends the unsent data block to the bus at the data block transmission time after a lapse of the stipulated time, so that the data can be restored.

BRIEF DESCRIPTION OF THE DRAWINGS

FIG. 2 shows an example of shortening a frame by dividing data in the first embodiment of the invention;

DETAILED DESCRIPTION OF PREFERRED EMBODIMENTS

Referring now to the accompanying drawings, there are shown preferred embodiments of a vehicle multiplex communication system of the invention.

<First embodiment>

Figure 1:
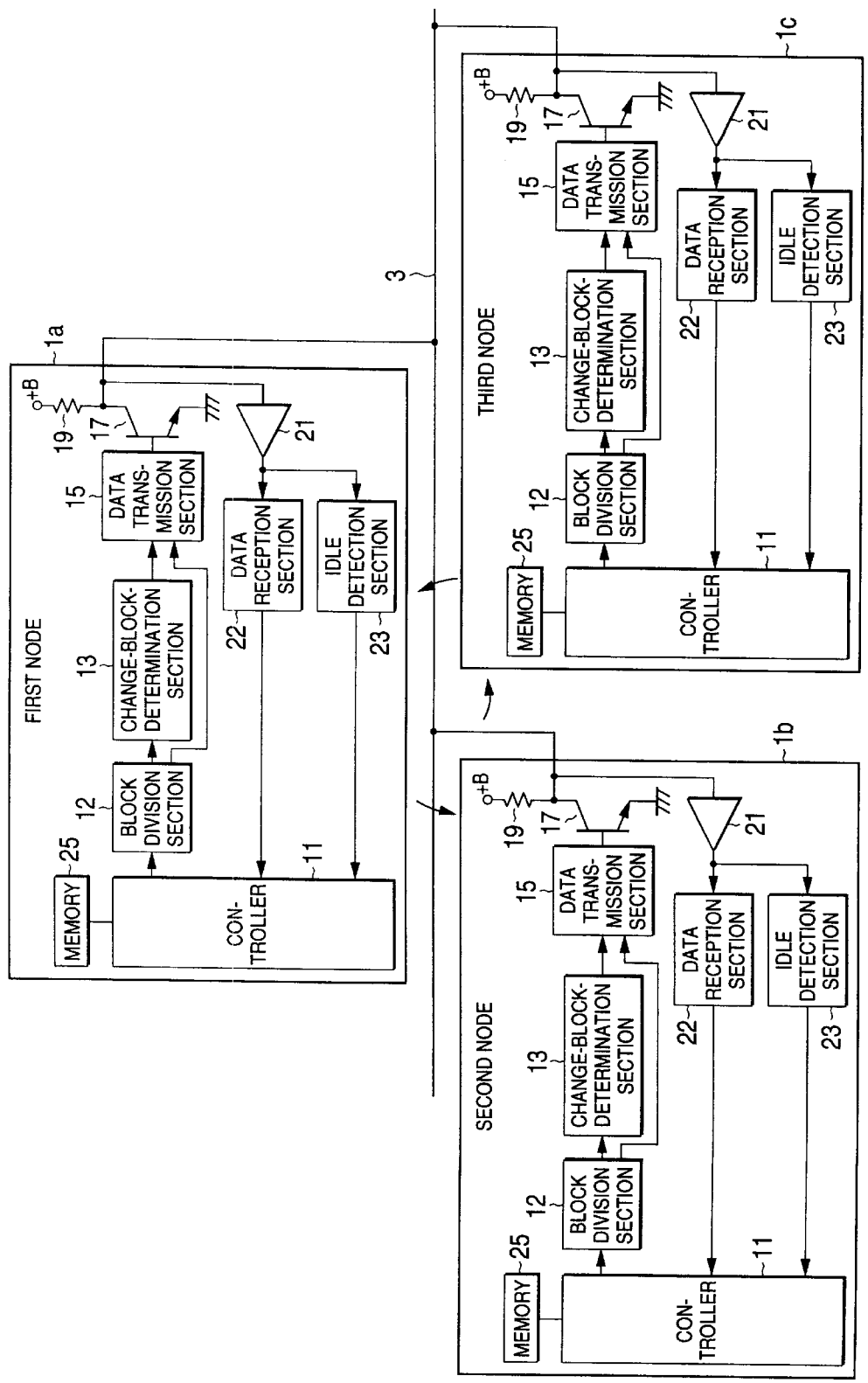
FIG. 1 is a block diagram to show the configuration of a first embodiment of a vehicle multiplex communication system of the invention.

FIG. 1 is a block diagram to show the configuration of a first embodiment of a vehicle multiplex communication system of the invention. In the vehicle multiplex communication system shown in FIG. 1, a first node 1a, a second node 1b, and a third node 1c are connected to a bus 3 in a network and a predetermined necessary number of data pieces are transferred from one node to another by token passing. That is, the transmission right is circulated to the nodes 1a–1c in a predetermined order and the node getting the transmission right sends a predetermined number of data pieces to the bus 3.

The first node 1a is, for example, an engine control node for controlling the engine operation in response to a driver who handles an accelerator, etc. The second node 1b is, for example, a mission control node for controlling an automatic transmission in response to the vehicle driving state. The third node 1c is, for example, a brake control node for controlling a brake by detecting a wheel lock condition.

Each of the first node 1a to the third node 1c comprises a controller 11 having a microprocessor, etc., a block division section 12, a change block determination section 13, a data transmission section 15, a transistor 17, a resistor 19, a buffer 21, a data reception section 22, an idle detection section 23, and a memory 25.

The block division section 12, the data reception section 22, the idle detection section 23, and the memory 25 are connected to the controller 11 and the data transmission section 15 is connected to a base of the transistor 17. An emitter of the transistor 17 is grounded and the bus 3, input of the buffer 21, and one end of the resistor 19 are connected to a collector of the transistor 17. Output of the buffer 21 is connected to the data reception section 22 and the idle detection section 23.

The block division section 12 divides the data to be transmitted into blocks to prepare data blocks. The change block determination section 13 determines whether or not each of the data blocks prepared by the block division section 12 is changed as an event occurs. If the change block determination section 13 determines that a data block is changed, the data transmission section 15 extracts only the changed data block (DB) from the block division section 12 and sends it to the bus 3 via the transistor 17.

Figure 2:
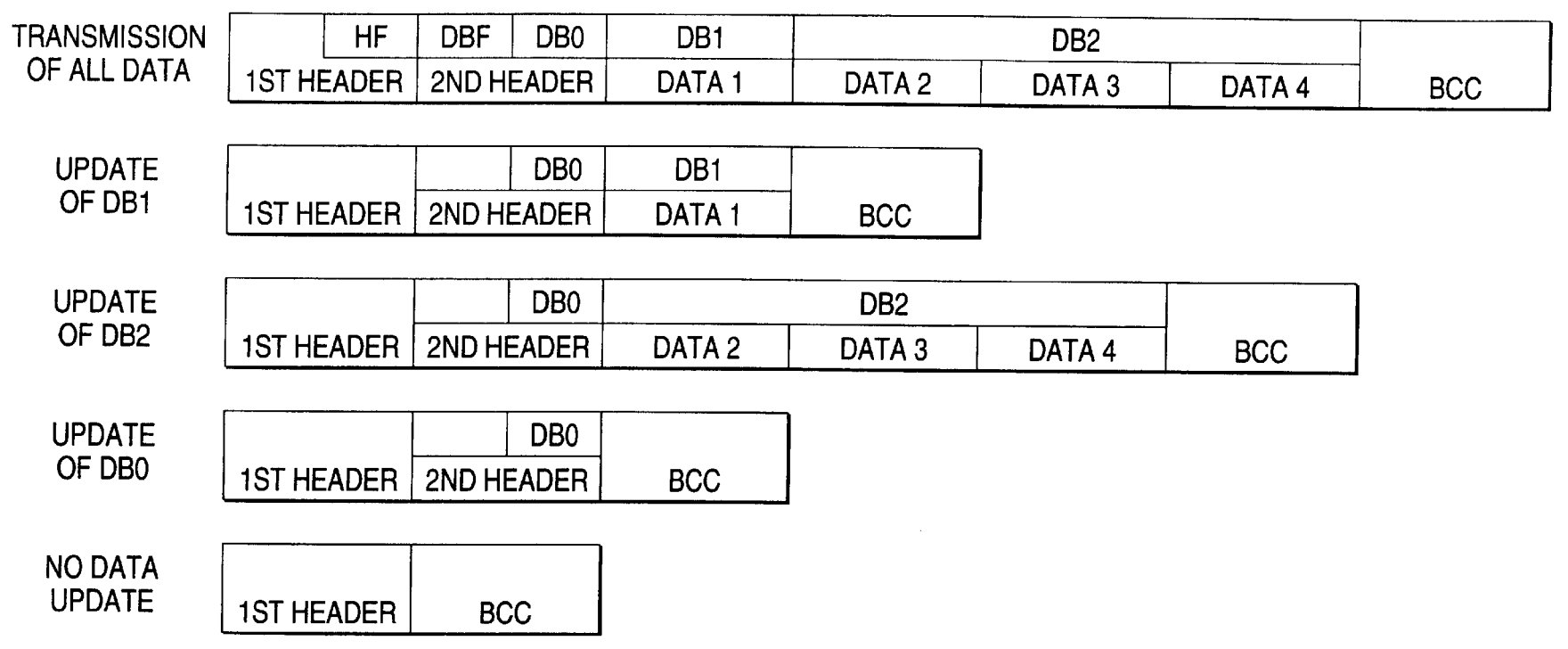

FIG. 2 shows an example of shortening a frame by dividing data. In the example shown in FIG. 2, the data is divided into three data blocks DB0–DB2. If all data is updated, a first header and a second header are prefixed to the three data blocks DB0–DB2 and a block check code (BCC) is suffixed thereto for transmission When at least either of the data blocks DB1 and DB2 changes and the frame is transmitted, the data block DB0 is also transmitted. If the data does not change, only the first header and BCC are transmitted. Further, a header flag (HF) contained in the first header indicates whether or not the second header exists. A data block flag (DBF) contained in the second header indicates whether or not the data blocks DB1 and DB2 exist.

The memory 25 stores transmission data and reception data. Each of the transmission data and reception data comprises a predetermined number of data pieces. The data reception section 22 receives a predetermined number of transmission data pieces transferred one at a time via the bus 3 and the buffer 21 from another node and sends the data to the controller 11. The idle detection section 23 detects data-transfer-stop time, which will be hereinafter referred to as idle time Ti, by checking whether or not data exists on the bus 3 through the buffer 21; it is made of a timer, etc.

The controller 11 sets a node to which the transmission right is transferred according to the address of the node; it increments the address of the node to which the transmission right is transferred by one, thereby changing the node to which the transmission right is transferred. For example, the node addresses may be set to 1–3 for assigning address 1 to the first node, address 2 to the second node, and address 3 to the third node. The data transmission section 15 sends a transmission right transfer message to the node to which the transmission right is transferred, set by the controller 11.

Figure 3:
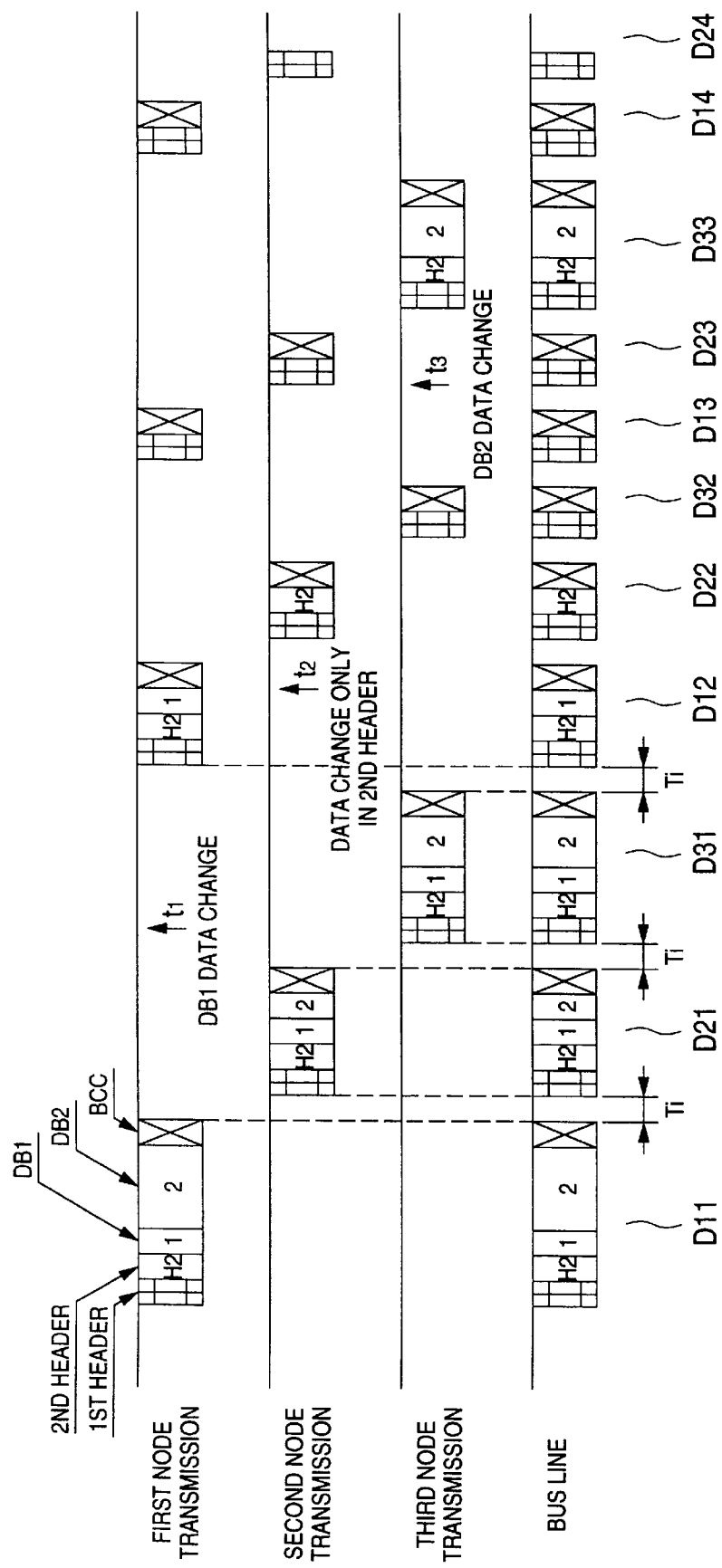
FIG. 3 is a timing chart of data transmission at nodes in the first embodiment of the invention.

Next, the operation of the first embodiment of the vehicle multiplex communication system thus configured will be discussed. FIG. 3 is a timing chart of data transmission at the nodes. The description to follow assumes that the transmission right is circulated to the first node 1a, the second node 1b, and the third node 1c in order, for example.

First, in the first node 1a getting the transmission right, the block division section 12 inputs the data stored in the memory 25 through the controller 11 and divides the data into fixed-length data blocks. The change block determination section 13 determines whether or not each of the data blocks DB0–DB2 is changed as an event occurs. If the data blocks DB0–DB2 are changed, the data transmission section 15 adds a first header, a second header, and a BCC to the data blocks DB0–DB2 and transmits the data frame to the bus 3 as data D11. In FIG. 3, the second header is abbreviated as H2, the data block DB1 as 1, and the data block DB2 as 2.

Next, when the second node 1b receives a transmission right transfer message from the first node 1a, it gets the transmission right. If the idle detection section 23 in the second node 1b detects idle time Ti, the data transmission section 15 in the second node 1b adds a first header, a second header, and a BCC to data blocks DB0–DB2 and transmits the data frame to the bus 3 as data D21.

Further, when the third node 1c receives a transmission right transfer message from the second node 1b, it gets the transmission right. If the idle detection section 23 in the third node 1c detects idle time Ti, the data transmission section 15 in the third node 1c adds a first header, a second header, and a BCC to data blocks DB0–DB2 and transmits the data frame to the bus 3 as data D31.

Here, assuming that the data block DB1 changes at time t1 in the first node 1a while the third node 1c is transmitting the data D31, the data transmission section 15 in the first node 1a adds a first header, a second header, and a BCC to the data block DB1 and transmits the data frame to the bus 3 as data D12.

Further, assuming that only the second header changes at time t2 in the second node 1b while the first node 1a is transmitting the data D12, the data transmission section 15 in the second node 1b transmits first header, second header, and BCC to the bus 3 as data D22.

Since each node thus transfers only changed data blocks to the bus 3, the average bus occupation time of data can be made shorter than that when data also containing unchanged data pieces is transferred to the bus 3; the transmission delay can be shortened.

<Second embodiment>

Figure 4:
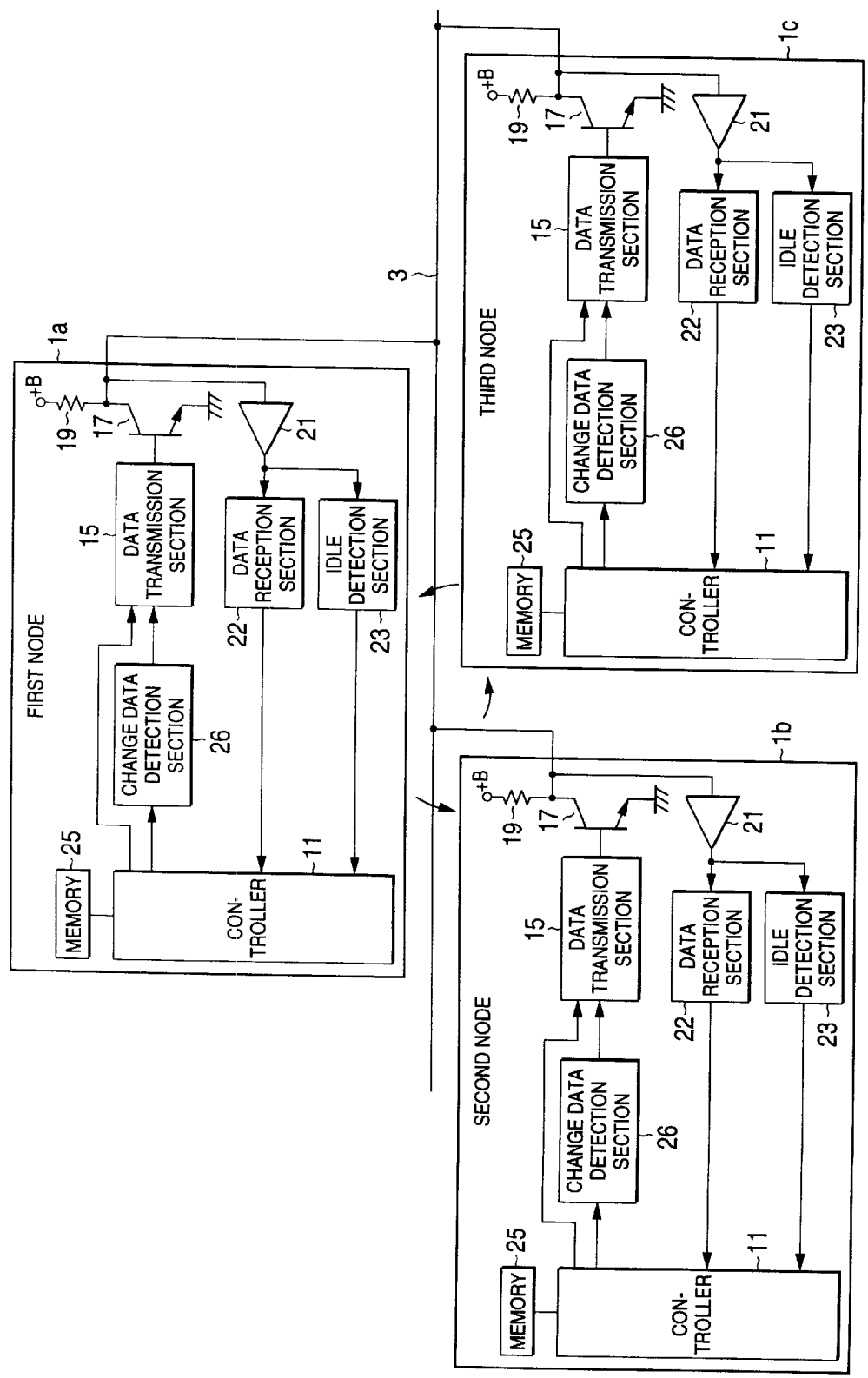
FIG. 4 is a block diagram to show the configuration of a second embodiment of a vehicle multiplex communication system of the invention.
Figure 5:
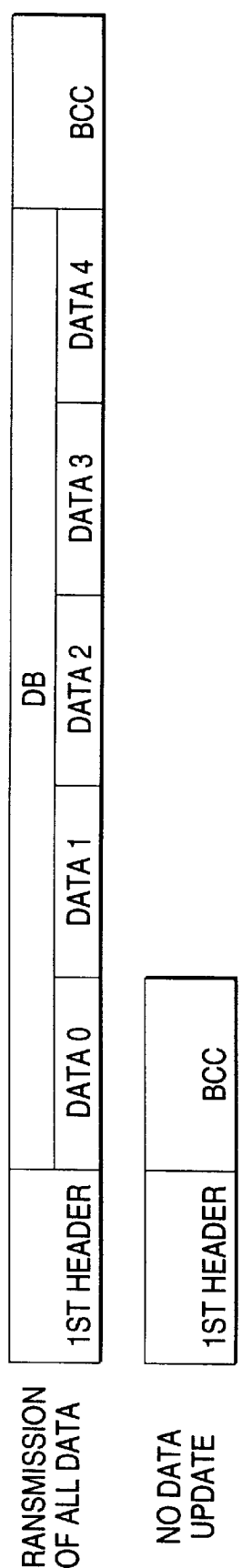
FIG. 5 shows an example of shortening a frame in the second embodiment of the invention.

Next, a second embodiment of a vehicle multiplex communication system of the invention will be discussed. FIG. 4 is a block diagram to show the configuration of the second embodiment of a vehicle multiplex communication system of the invention.

As described, the vehicle multiplex communication system of the first embodiment shown in FIG. 1 comprises the block division section 12 and the change block determination section 13 for dividing data into blocks and transferring only changed data blocks to the bus 3.

The vehicle multiplex communication system of the second embodiment shown in FIG. 4 is provided such that, when an event occurs and data changes, the vehicle multiplex communication system transfers all the data, first header, and BCC to a bus 3. On the contrary, when data does not change, the vehicle multiplex communication system transfers only the first header and BCC to the bus 3. Thus, the vehicle multiplex communication system of the second embodiment comprises a change data determination section 26. Parts corresponding to those previously described with reference to FIG. 1 are denoted by the same reference numerals in FIG. 4 and will not be discussed in detail again.

The change data determination section 26 determines whether or not the data to be transmitted changes as an event occurs. When the change data determination section 26 determines that the data changes, a data transmission section 15 transfers all the data to the bus 3; when the change data determination section 26 determines that the data does not change, the data transmission section 15 transfers the header and BCC to the bus 3.

Figure 6:
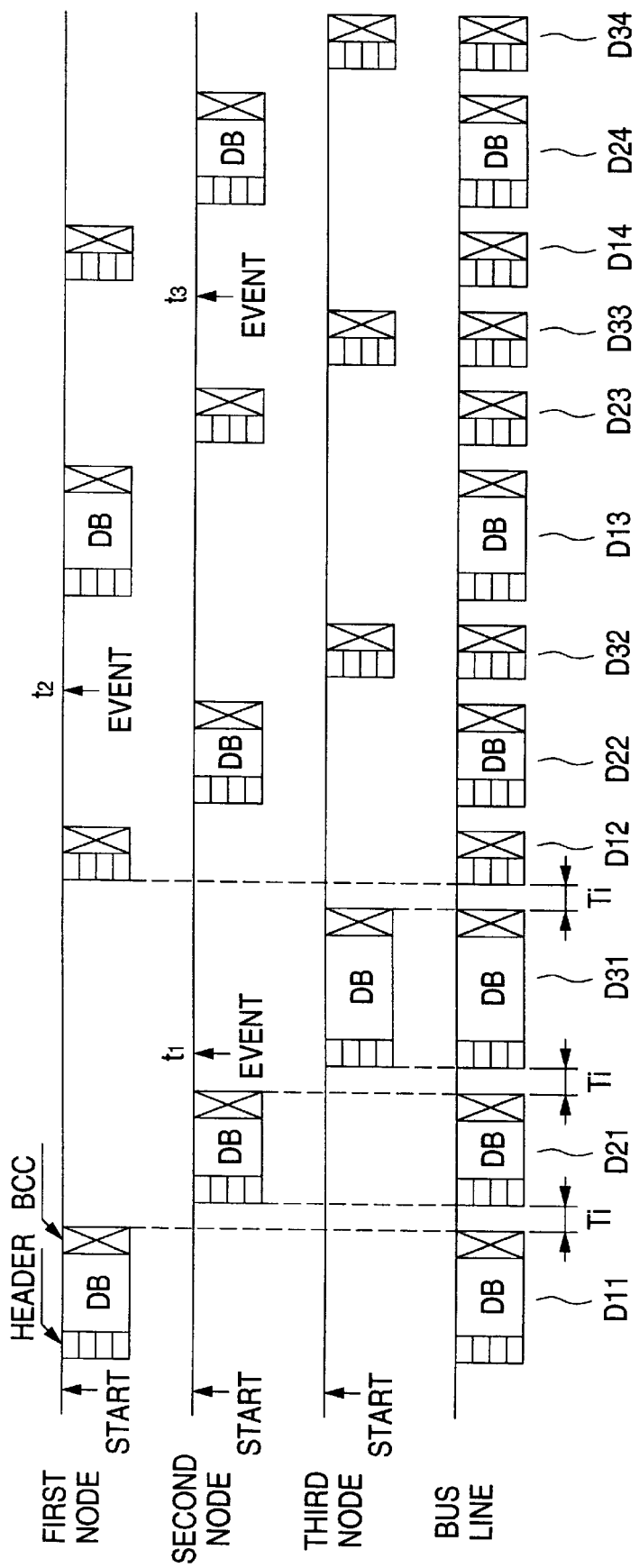
FIG. 6 is a timing chart of data transmission at nodes in the second embodiment of the invention.

Next, the operation of the vehicle multiplex communication system of the second embodiment thus configured will be discussed with reference to FIG. 6. First, in a first node 1a, the change data determination section 26 determines whether or not the data to be transmitted changes as an event occurs. When the change data determination section 26 determines that data DB changes, the data transmission section 15 adds a header and a BCC adds to all the data DB and transfers the data frame to the bus 3 as data DD1.

Next, in a second node 1b, if an idle detection section 23 detects idle time Ti, the data transmission section 15 in the second node 1b adds a header and a BCC to data DB and transmits the data frame to the bus 3 as data D21. Further, in a third node 1c, if the idle detection section 23 detects idle time Ti, the data transmission section 15 in the third node 1c adds a header and a BCC to data DB and transmits the data frame to the bus 3 as data D31.

Next, since the data DB does not change in the first node 1a, the data transmission section 15 in the first node 1a transmits only the header and BCC to the bus 3 as data D12.

Further, if an event occurs at time t1 in the second node 1b while the third node 1c is transmitting the data D31, the data transmission section 15 in the second node 1b adds a header and a BCC to the data DB and transmits the data frame to the bus 3 as data D22.

Since each node thus transfers data to the bus 3 only when the data is changed, the average bus occupation time of data can be made shorter than that when data also containing unchanged data pieces is transferred to the bus 3; the transmission delay can be shortened.

<Third embodiment>

Figure 7:
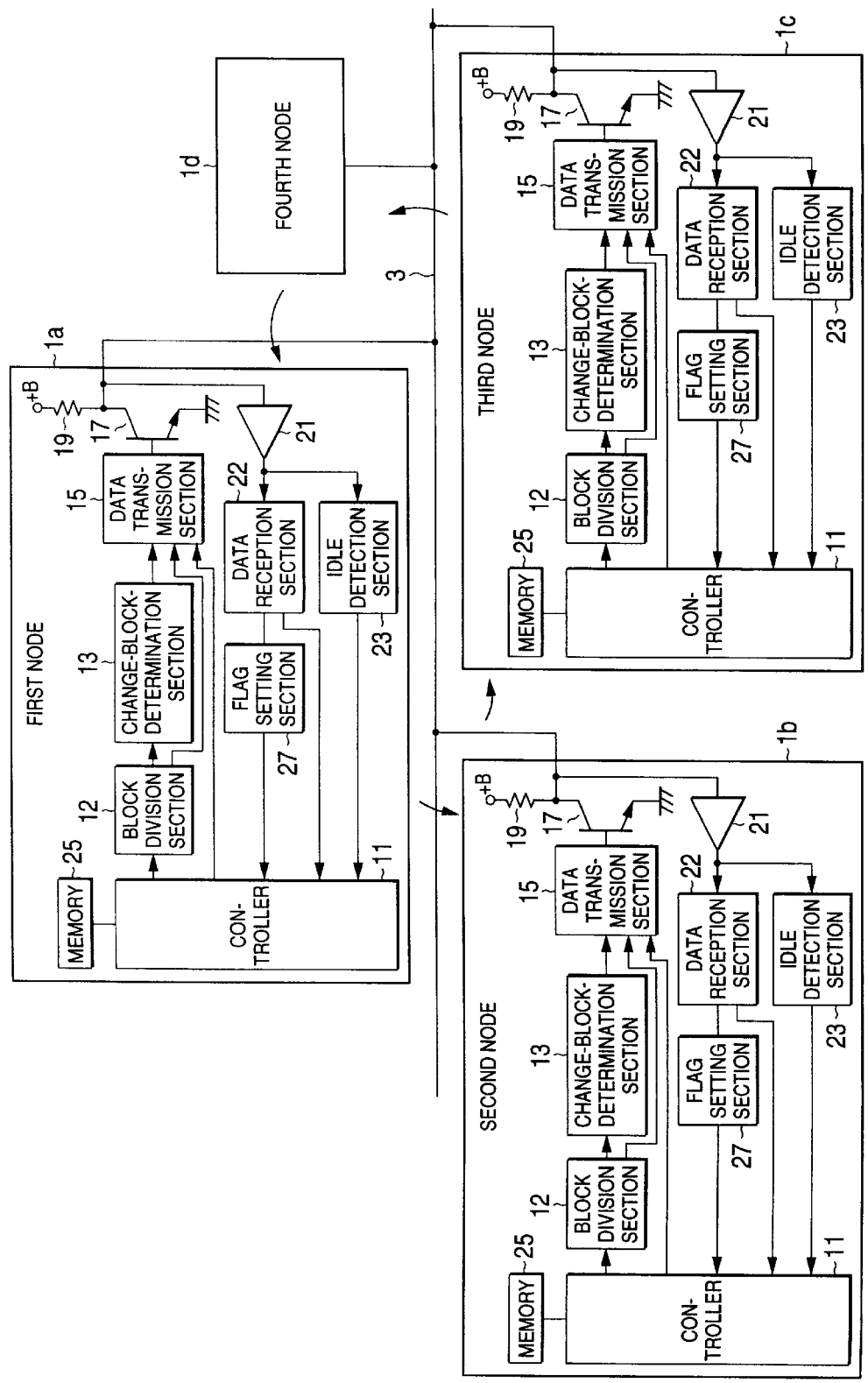
FIG. 7 is a block diagram to show the configuration of a third embodiment of a vehicle multiplex communication system of the invention.

Next, a third embodiment of a vehicle multiplex communication system of the invention will be discussed. FIG. 7 is a block diagram to show the configuration of the third embodiment of a vehicle multiplex communication system of the invention. The vehicle multiplex communication system shown in FIG. 7 comprises a flag setting section 27, in addition to the configuration of the first embodiment, for requesting data to be resent when a reception error occurs.

When a reception error occurs in a data reception section 22, a flag setting section 27 adds an NACK flag to a header and outputs to a controller 11. A data transmission section 15 sends the NACK flag from the controller 11 to a bus 3.

If the data reception section 22 receives data to which an NACK flag is added, the data transmission section 15 transmits all of a predetermined number of data pieces at the next data transmission time in response to an all data transmission instruction from the controller 11. The other parts of the third embodiment are the same as these of the first embodiment, and will not be discussed in detail again. A fourth node 1d having the same configuration as first to third nodes 1a–1c is connected to the bus 3.

Figure 8:
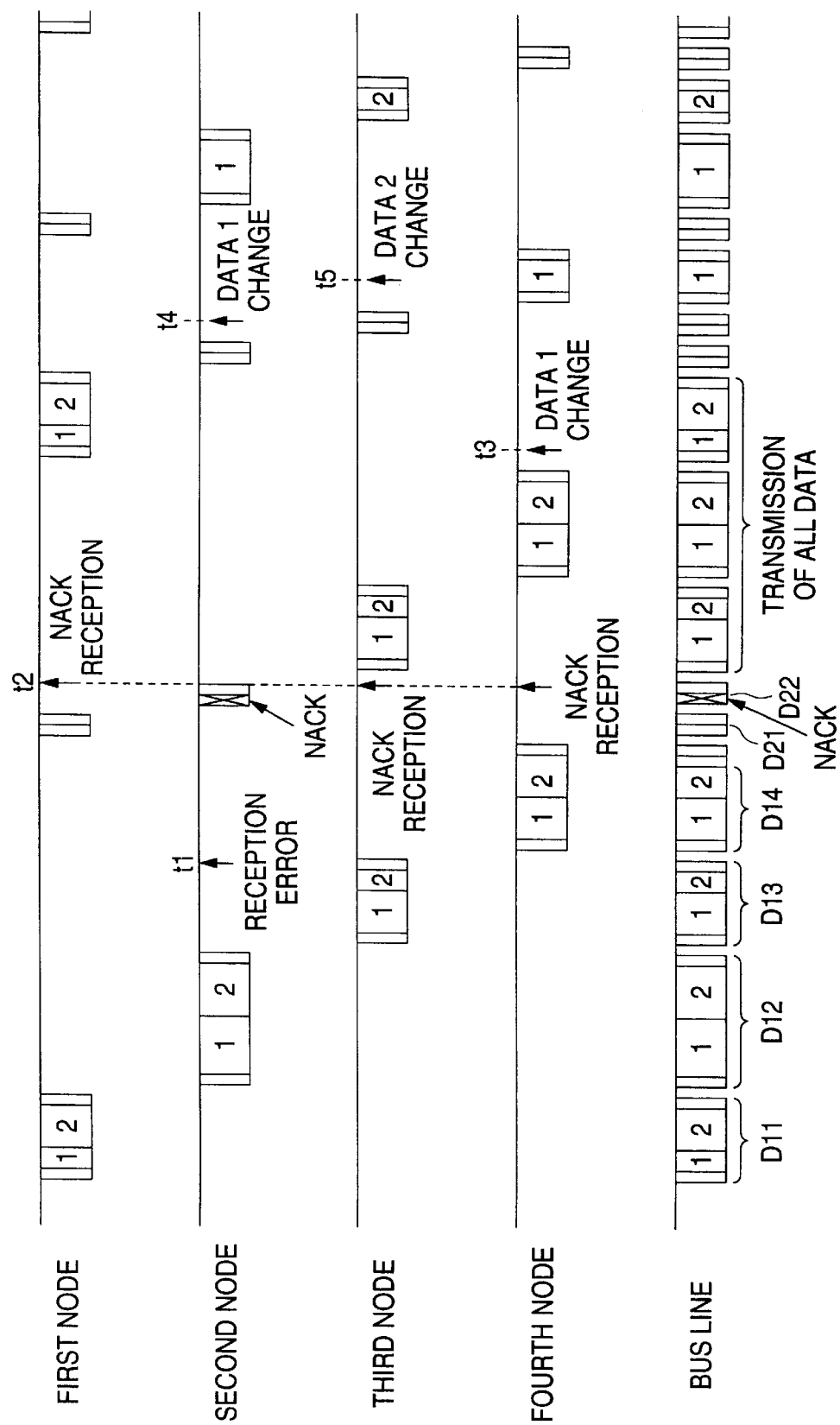
FIG. 8 is a timing chart of data transmission when a reception error occurs in one node in the third embodiment of the invention.

Next, processing performed when a reception error occurs only in one node will be discussed with reference to FIG. 8. First, the transmission right is circulated in the address order and data is sent to the bus 3 in the order of the first node 1a, the second node 1b, the third node 1c, and the fourth node 1d.

Next, if a reception error occurs at time t1 in the second node 1b, the flag setting section 27 in the second node 1b sets an NACK flag in a header and outputs to the controller 11. The data transmission section 15 in the second node 1b transfers the header to which the NACK flag is added and a BCC from the controller 11 to the bus 3.

Then, the first node 1a, the third node 1c, and the fourth node 1d receive the NACK flag on the bus 3 at time t2. Then, the data transmission section 15 in each of the first node 1a, the third node 1c, and the fourth node 1d transmits all data to the bus 3 at the next data transmission time.

Thus, all data in all nodes 1a–1d is transmitted after the reception error occurs, and the second node 1b in which the reception error occurs can receive the data that cannot be received due to the error. Therefore, when a reception error occurs, data resend control can be performed easily.

Figure 9:
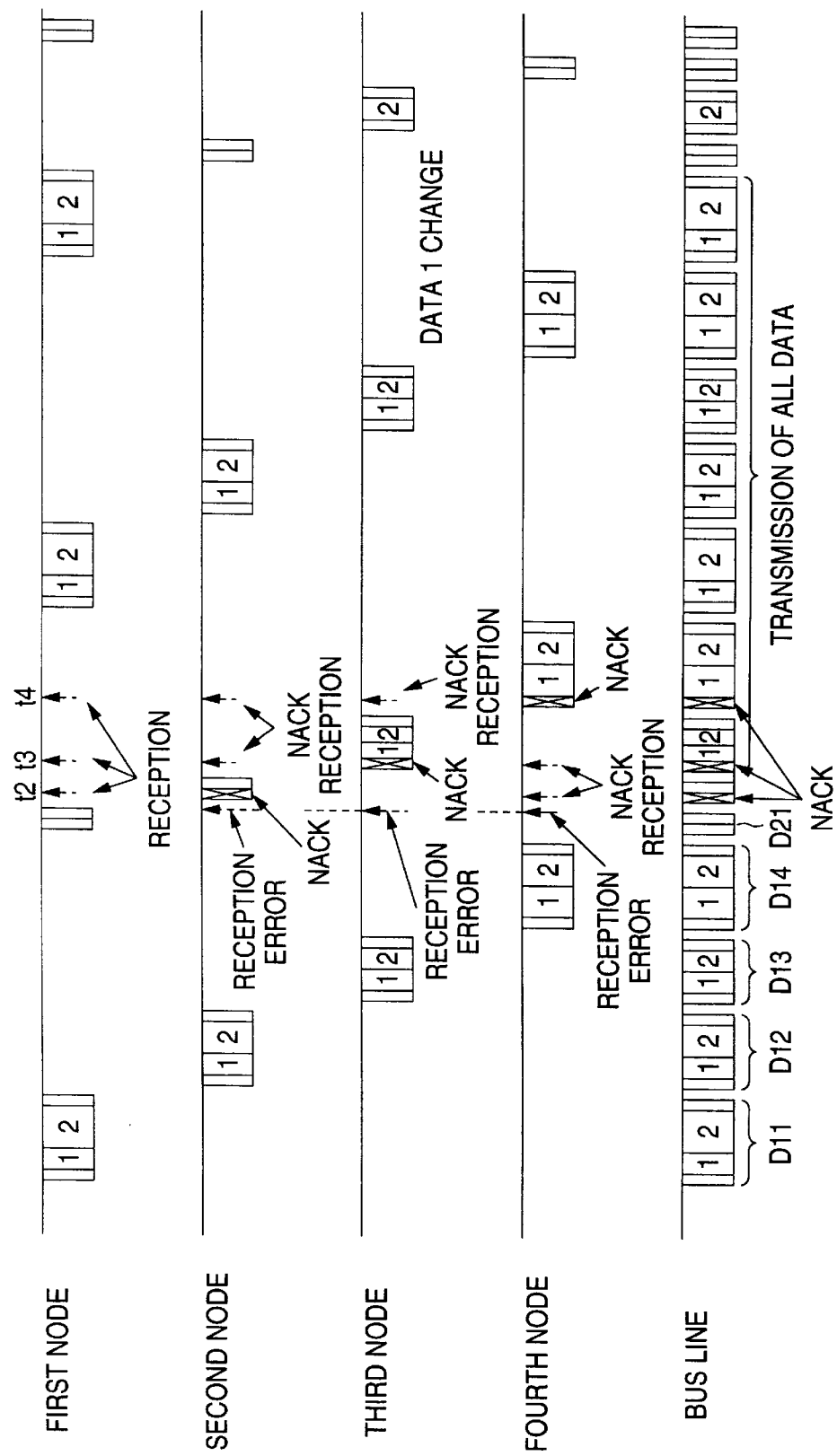
FIG. 9 is a timing chart of data transmission when a reception error occurs in more than one node at a time in the third embodiment of the invention.

Processing performed when a reception error occurs in more than one node at a time will be discussed with reference to FIG. 9. FIG. 9 assumes that a reception error occurs in the second to fourth nodes 1b–1d at time t1. When the second node 1b transmits an NACK flag to the bus 3, the first node 1a and the fourth node 1d receive the NACK flag at time t2. Further, when the third node 1c transmits an NACK flag to the bus 3, the first node 1a, the second node 1b, and the fourth node 1d receive the NACK flag at time t3. Further, when the fourth node 1d transmits an NACK flag to the bus 3, the first to third nodes 1a–1c receive the NACK flag at time t4.

That is, the nodes 1a–1d receive the NACK flag and thus transmit all data at the next transmission time. Therefore, each of the second to fourth nodes 1b–1d in which the reception error occurs can receive the data that cannot be received due to the error.

<Fourth embodiment>

Figure 10:
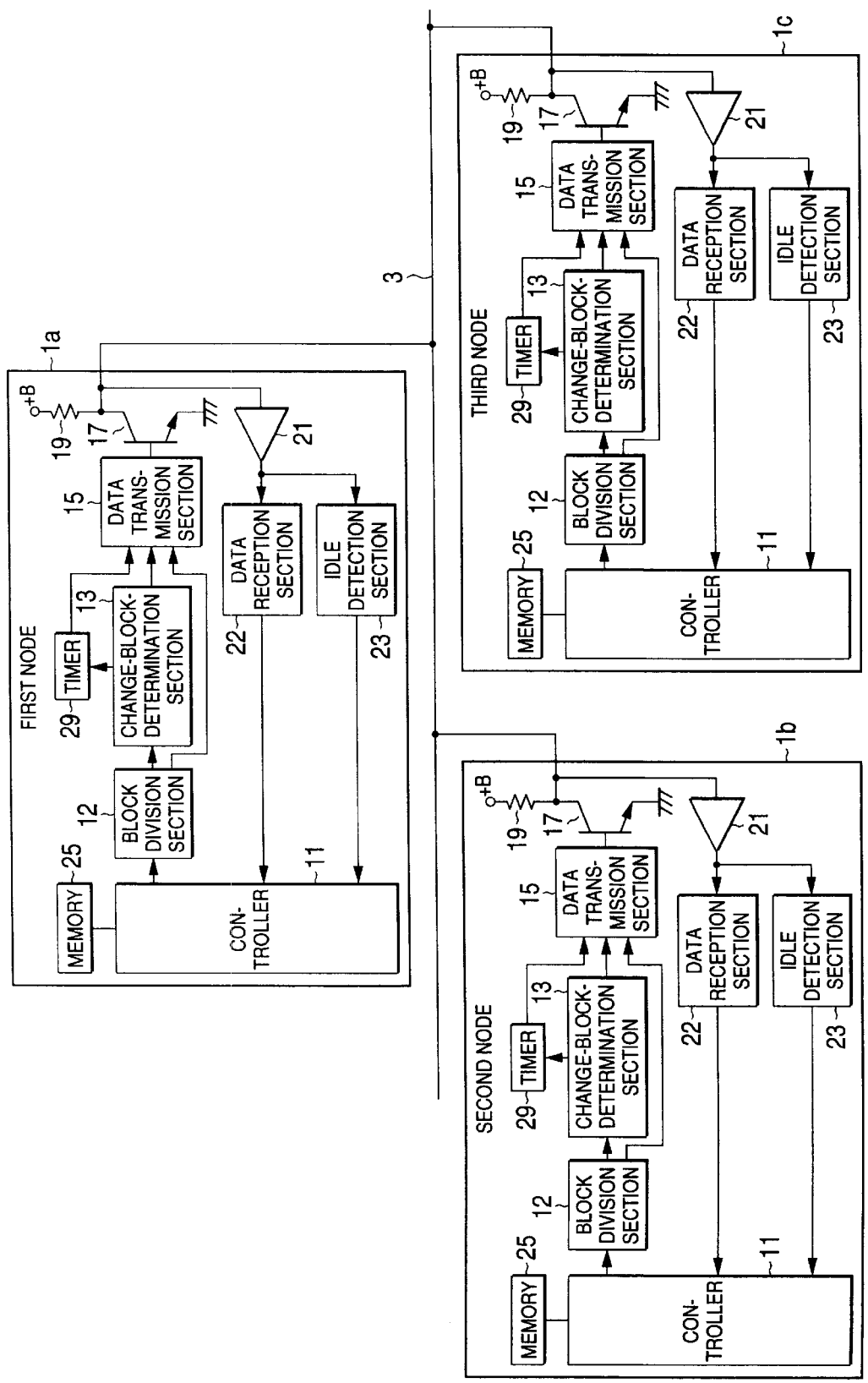
FIG. 10 is a block diagram to show the configuration of a fourth embodiment of a vehicle multiplex communication system of the invention.

Next, a fourth embodiment of a vehicle multiplex communication system of the invention will be discussed. FIG. 10 is a block diagram to show the configuration of the fourth embodiment of a vehicle multiplex communication system of the invention. The vehicle multiplex communication system of the first embodiment transmits data only when the data changes. However, transmission data change may not accurately be transmitted or already received data may become deformed due to noise, etc. Thus, the vehicle multiplex communication system shown in FIG. 10 is characterized by the fact that it comprises a timer 29 in addition to the configuration of the first embodiment.

The timer 29 counts stipulated time. If each data block is not sent to a bus 3 within the stipulated time counted by the timer 29, a data transmission section 15 sends the unsent data block to the bus 3 at the next data transmission time after a lapse of the stipulated time. Parts identical with those previously described with reference to FIG. 1 are denoted by the same reference numerals in FIG. 10 and will not be discussed in detail again.

Figure 11:
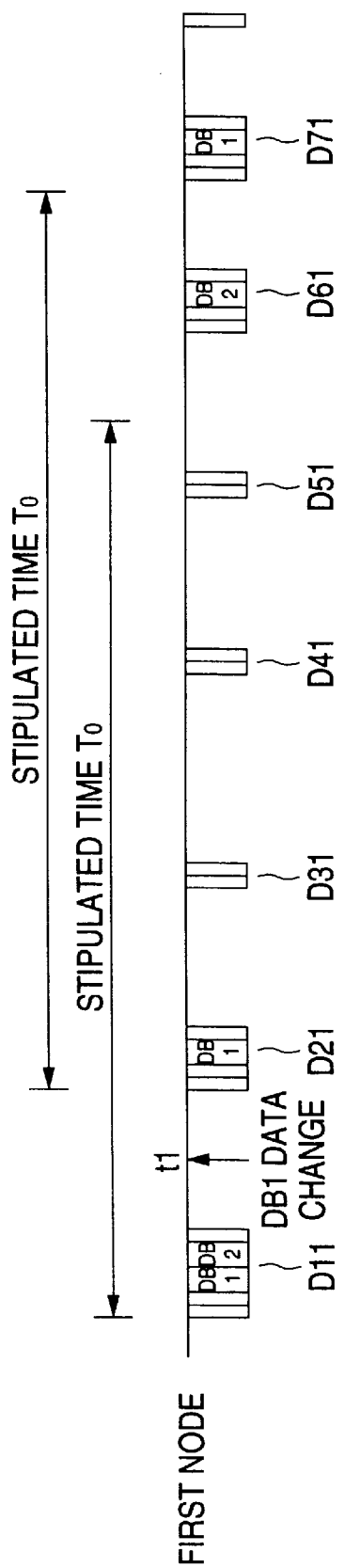
FIG. 11 is a timing chart to show periodical data update in the fourth embodiment of the invention.
Figure 12:
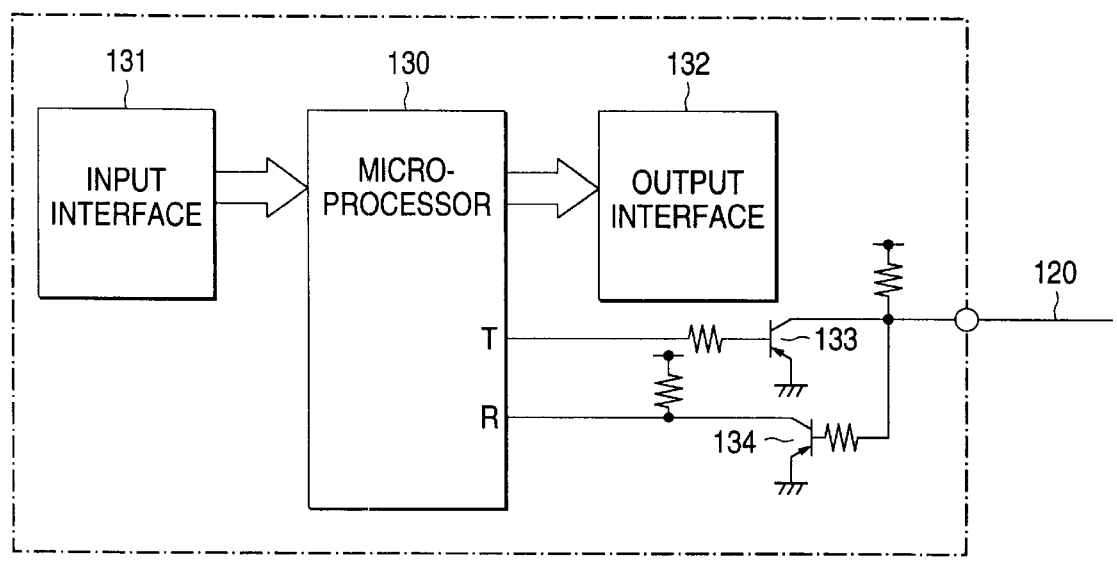
FIG. 12 is a block diagram to show the configuration of each electronic control unit in a conventional on-board electronic control system.
Figure 13:
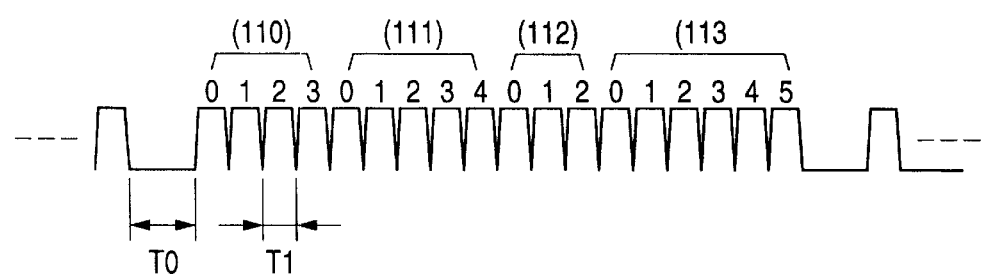
FIG. 13 is a timing chart to show data transmission in the conventional on-board electronic control system.

Next, the operation of the fourth embodiment will be discussed with reference to FIG. 11. Here, data transmission at a first node 1a is taken as an example. The data transmission section 15 adds a first header, a second header, and a BCC to data blocks DB0–DB2 and transmits the data frame to the bus 3 as data D11. At this point in time, the timer 29 starts counting the time.

Next, if the data block DB1 changes, the data transmission section 15 adds a header and a BCC to the data block DB1 and transmits the data frame to the bus 3 as data D21. At this point in time, the timer 29 starts counting the time. Further, at the first timing to follow, the data blocks do not change and header and BCC are transmitted to the bus 3 as data D31. At the second timing, header and BCC are also transmitted to the bus 3 as data D41. At the third timing, header and BCC are also transmitted to the bus 3 as data D51.

Then, the data block DB2 is not transmitted exceeding the stipulated time T0 since the data transmission time of the data D11, thus at the next transmission time after a lapse of the stipulated time T0, a header and a BCC are added to the data block DB2 and the data frame is transmitted as data D61. Since the data block DB1 is not transmitted exceeding the stipulated time T0 since the data transmission time of the data D21, at the next transmission time after a lapse of the stipulated time T0, a header and a BCC are added to the data block DB1 and the data frame is transmitted as data D71.

Since changed data can be transmitted and unchanged data is also transmitted in a cycle of about the stipulated time, reception data can be updated and even if a communication error is not detected or a bit error not related to communication occurs, the error can be repaired in about the stipulated time and the reliability can be improved.

The data block not received for the time twice or more the stipulated time may be placed in a default mode. In the default mode, the data may be unchanged or may be changed to a default value in response to the data type.

According to the invention, data is divided into blocks and whether or not each data block changes as an event occurs is determined. If it is determined that a data block changes, the data block is extracted and sent to the bus. Thus, unchanged data blocks are not transferred, so that the bus occupation time can be shortened, the time efficiency of data can be improved, and the transmission delay of data can be shortened.

Whether or not data changes as an event occurs is determined. If it is determined that the data changes, all the data is transferred to the bus. Thus, unchanged data is not transferred, so that the bus occupation time can be shortened, the time efficiency of data can be improved, and the transmission delay of data can be shortened.

The data transmission section in the node where a reception error occurs adds flag information indicating that the reception error occurs to the changed data block and sends the data frame to the bus, whereby resend control at the reception error occurrence time can be executed easily.

The node receiving the data block to which the flag information is added sends all the next data block to the bus at the next data block transmission time, whereby the node in which a reception error occurs can receive the data that cannot be received due to the error.

If a data block is not sent to the bus within the stipulated time, the unsent data block is sent to the bus at the data block transmission time after a lapse of the stipulated time, so that the data can be restored.

What is claimed is:

1. A vehicle communication multiplex system comprising:
   a bus; and
   a plurality of nodes connected to said bus, wherein a transmission right circulates to said nodes in a predetermined orders each of said nodes that gets the transmission right sending a predetermined number of data to said bus, each of said nodes including,
      a block division section configured to divide the data into data blocks,
      a change-block-determination section configured to determine whether each of the data blocks changes as an event occurs, and
      a data transmission section configured to extract the data block from said block division section and to send the extracted data block to said bus, if said change-block-determination section determines that the data block changes.

2. A vehicle communication multiplex system comprising:
   a bus; and
   a plurality of nodes connected to said bus, wherein a transmission right circulates to said nodes in a predetermined order, each of said nodes that gets the transmission right sending a predetermined number of data to said bus, each of said nodes including,
      a block division section configured to divide the data to data block,
      a change-block-determination section configured to determine whether the data changes as an event occurs, and
      a data transmission section configured to transfer the data to said bus, if said change block determination section determines that the data changes.

3. The vehicle communication multiples system as in claim 1, wherein each of said nodes further includes a flag setting section configured to set a flag indicating reception error occurrence if a reception error occurs in a home node, and said data transmission section in the node where the reception error occurs adds flag information set by said flag setting section to the changed data block and sends a corresponding data frame to said bus.

4. The vehicle communication multiples system as in claim 3, wherein, when transmitting a data block next to the changed data block already transmitted, the node receiving the changed data block to which the flag information is added on said bus sends the data block to said bus.

5. The vehicle communication multiplex system as in claim 1, wherein each of said nodes further includes a count section for counting stipulated time, and if the data block is not sent to said bus within the stipulated time, said data transmission section sends the unsent data block to said bus at the data block transmission time after a lapse of the stipulated time.

6. The vehicle communication multiplex system as in claim 1, wherein one of the data blocks serves as a header, and if said change-block-determination section determines that the data blocks do not change, said data transmission section sends the header to said bus.

7. The vehicle communication multiplex system as in claim 2, wherein the data includes a header, and if said change-block-determination section determines that the data does not change, said data transmission section sends the header to said bus.

8. A vehicle communication multiplex system comprising:
- a bus; and
- a plurality of nodes connected to said bus, wherein a transmission right circulates to said nodes in a predetermined order, each of said nodes that gets the transmission right sending a predetermined number of data to said bus, each of said nodes including,
  - a block division section configured to divide the data into data blocks,
  - a change-block-determination section configured to determine whether each of the data blocks changes as an event occurs,
  - a data transmission section, if said change-block-determination section determines that a data block changes, being configured to extract the data block from said block division section and to send the extracted data block to said bus, and
  - a count section for counting stipulated time, wherein if the data block is not sent to said bus within the stipulated time, said data transmission section sends the unsent data block to said bus at the data block transmission time after a lapse of the stipulated time.

9. A vehicle communication multiplex system comprising:
- a bus; and
- a plurality of nodes connected to said bus, wherein a transmission right circulates to said nodes in a predetermined order, each of said nodes that gets the transmission right sending a predetermined number of data to said bus, each of said nodes including,
  - a block division section configured to divide the data into data blocks,
  - a change-block-determination section configured to determine whether each of the data blocks changes as an event occurs, and
  - a data transmission section, if said change-block-determination section determines that a data block changes, being configured to extract the data block from said block division section and to send the extracted data block to said bus, wherein one of the data blocks serves as a header, and if said change-block-determination section determines that the data blocks do not change, said data transmission section sends the header to said bus.

10. A vehicle communication multiplex system comprising:
- a bus; and
- a plurality of nodes connected to said bus, wherein a transmission right circulates to said nodes in a predetermined order, each of said nodes that gets the transmission right sending a predetermined number of data to said bus, each of said nodes including,
  - a block division section configured to divide the data into data block
  - a change-block-determination section configured to determine whether the data changes as an event occurs, and
  - a data transmission section, if said change block determination section determines that the data changes, being configured to transfer the data to said bus, wherein the data includes a header, and if said change-block-determination section determines that the data does not change, said data transmission section sends the header to said bus.

* * * * *

UNITED STATES PATENT AND TRADEMARK OFFICE
CERTIFICATE OF CORRECTION

PATENT NO.    : 6,151,306
DATED         : November 21, 2000
INVENTOR(S)   : Ogasawara et al.

It is certified that error appears in the above-identified patent and that said Letters Patent is hereby corrected as shown below:

Column 8,
Line 26, change "orders" to -- order --.
Line 47, change "to" to -- into --.
Line 48, delete "block".
Line 53, change "block" to -- data --.

Column 10,
Line 30, change "block" to -- blocks, --.

Signed and Sealed this

Sixteenth Day of October, 2001

Attest:

*Attesting Officer*

NICHOLAS P. GODICI
*Acting Director of the United States Patent and Trademark Office*